US006176535B1

(12) United States Patent
Chaloult et al.

(10) Patent No.: US 6,176,535 B1
(45) Date of Patent: Jan. 23, 2001

(54) MULTI-POSITIONAL VEHICLE SHELF

(75) Inventors: Brian Chaloult, Rochester Hills; George Walczowski, New Baltimore; Thomas D Mihelich, Troy, all of MI (US)

(73) Assignee: DaimlerChrysler Corporation, Auburn Hills, MI (US)

(*) Notice: Under 35 U.S.C. 154(b), the term of this patent shall be extended for 0 days.

(21) Appl. No.: 09/568,602

(22) Filed: May 10, 2000

Related U.S. Application Data

(63) Continuation of application No. 09/218,314, filed on Dec. 22, 1998, now Pat. No. 6,113,172.

(51) Int. Cl.[7] .............................. B62D 33/08; B60R 7/02; B60R 9/06; B60P 3/34
(52) U.S. Cl. .................................. 296/37.16; 296/26.08; 296/26.1; 296/191; 296/24.1; 224/496; 224/542; 224/564; 224/925; 211/134
(58) Field of Search .............................. 296/26.08, 26.09, 296/26.1, 26.11, 37.16, 191, 195, 69, 24.1; 224/495, 496, 497, 542, 564, 925; 248/235, 240.04; 211/134, 186, 187; 108/109

(56) References Cited

U.S. PATENT DOCUMENTS

| 2,740,534 | * | 4/1956 | Torrent ................................. 211/195 |
| 2,889,097 | * | 6/1959 | Broehl .................................. 224/542 |
| 4,452,151 | * | 6/1984 | Jarrad .................................. 108/44 |
| 4,455,948 | * | 6/1984 | Torres . |
| 4,799,849 | * | 1/1989 | Miller .................................. 414/462 |

(List continued on next page.)

FOREIGN PATENT DOCUMENTS

| 16 88 723 U | * | 12/1954 | (DE) . |
| 19 35 347 U | * | 3/1996 | (DE) . |
| 0061928 | * | 2/1986 | (EP) . |
| 0066514 | * | 2/1986 | (EP) . |
| 0432824 | * | 5/1995 | (EP) . |
| 0662406 | * | 7/1995 | (EP) . |
| 718 146 | * | 6/1996 | (EP) . |
| 0736411 | * | 10/1996 | (EP) . |
| 0927663 | * | 7/1999 | (EP) . |
| 1503650 | * | 10/1967 | (FR) . |
| 1 503 650 | * | 12/1977 | (FR) . |
| 2 353 417 | * | 12/1977 | (FR) . |
| 2254363 | * | 10/1992 | (GB) .................................. 224/925 |
| 61-075036 | * | 4/1986 | (JP) . |
| 40-5238323 | * | 9/1993 | (JP) .................................. 224/542 |

OTHER PUBLICATIONS

1998 Renault Megane—pertint photographs.*
Detroit news: Business Section; D. jawett; For 1999 Models, it's what's inside that counts; Oct. 2, 1998, P. 1B and 3B.*

* cited by examiner

Primary Examiner—D. Glenn Dayoan
Assistant Examiner—Patricia Engle
(74) Attorney, Agent, or Firm—Marc Lorelli

(57) ABSTRACT

A partitioning system for use in the storage area of a vehicle is disclosed. The partitioning system includes a multipurpose shelf that can be positioned in a plurality of different locations. The shelf can be disposed (1) horizontally near the top of the rear row of seats to act as a security cover; (2) horizontally along the floor in the storage area; (3) horizontally to cooperate of a folded last row of seats to provide a generally flat surface from the end gate into the passenger area; (4) vertically and adjacent to the rear row of seats; and (5) horizontally, while the end gate is open, such that the shelf extends beyond the storage area as defined by a closed end gate. The shelf includes a pivotable support leg that may contact the vehicle body to support the shelf in this horizontal position that extends beyond the storage area defined by a closed end gate.

6 Claims, 7 Drawing Sheets

U.S. PATENT DOCUMENTS

| | | | |
|---|---|---|---|
| 4,856,840 | * | 8/1989 | Hanley . |
| 5,037,154 | * | 8/1991 | Senba et al. ................. 296/37.16 |
| 5,381,940 | * | 1/1995 | Wright ........................ 224/42.42 |
| 5,492,386 | * | 2/1996 | Callum ............................. 296/64 |
| 5,669,537 | * | 9/1997 | Saleem ............................ 224/539 |
| 5,685,592 | * | 11/1997 | Heinz ............................ 296/37.16 |
| 5,769,294 | * | 6/1998 | Heinz et al. .................... 224/567 |
| 5,820,190 | * | 10/1998 | Benner ......................... 296/26.09 |
| 5,938,262 | * | 8/1999 | Mills ............................ 296/26.09 |

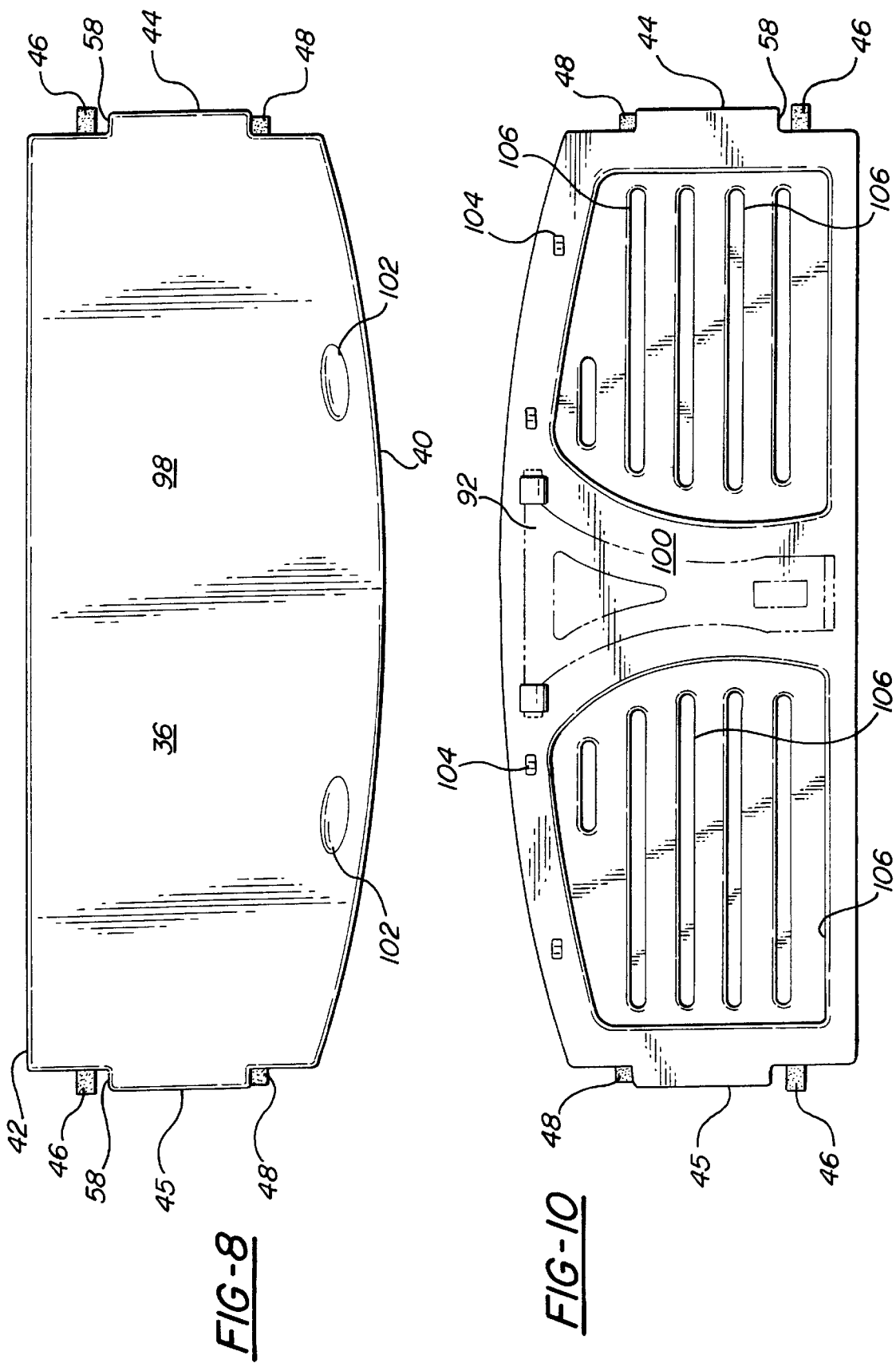

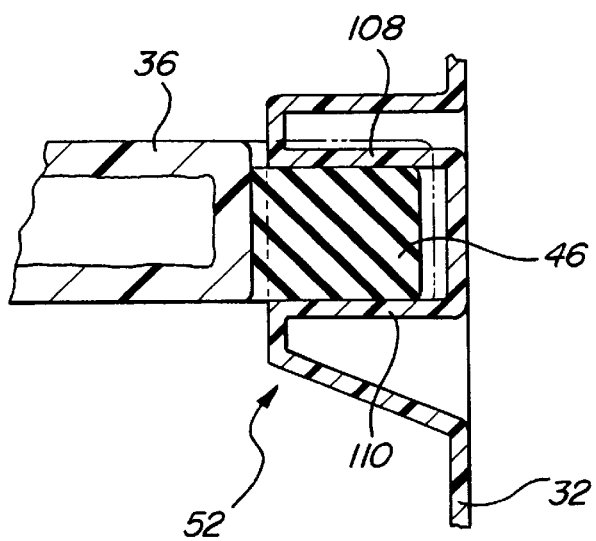
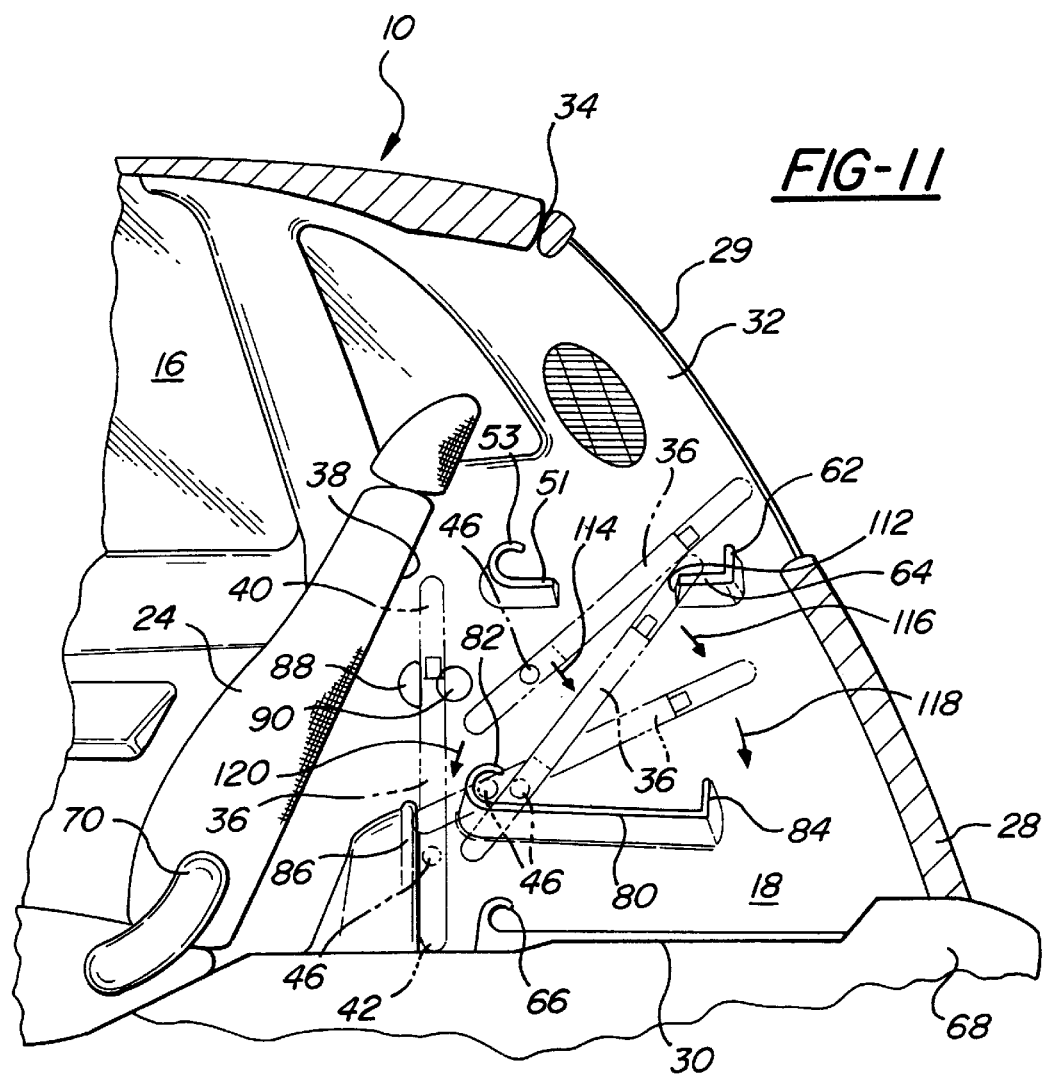

MULTI-POSITIONAL VEHICLE SHELF

This is a continuation of my earlier filed United States Application filed on Dec. 22, 1998 and having Ser. No. 09/218,314 now U.S. Pat. No. 6,113,172.

BACKGROUND OF THE INVENTION

1. Technical Field

The present invention generally pertains to the cargo carrying capacity of automotive vehicles. More particularly, the present invention relates to a multipurpose shelf for use in the storage area of an automotive vehicle. More specifically, but without restriction to the particular embodiment and/or use which is shown and described for purposes of illustration, the present invention relates to a multipurpose shelf system for partitioning the storage area of a vehicle to provide a plurality of useful features.

2. Discussion

Most modern motor vehicles, in addition to the passenger area, incorporate a storage area of some sort into the vehicle. In a passenger car, the typical storage area is a trunk. In a minivan, sport utility vehicle, or hybrid-type vehicle, the storage area is generally the space behind the last row of seats. This storage area is defined by the side quarter trim panels, the floor, the back of the last row of seats, and the end gate of the vehicle. There has been an increased demand for these types of vehicles in recent years. The increased popularity of minivans, sport utility vehicles, and hybrid-type vehicles can be attributed in some measure to their ability to carry cargo compared to a passenger car. Accordingly, there has been an industry wide effort to provide vehicles that can efficiently utilize available space not only for carrying passengers but cargo as well.

To enhance the cargo carrying capabilities of a storage area, flanges have been used to support luggage that may traverse the storage area as disclosed in U.S. Pat. No. 2,740,534. This arrangement is extremely dependent on the size of the luggage that the operator desires to stow. Since then, there have been many attempts to enhance the utility of the storage area of a vehicle. U.S. Pat. No. 5,669,537 discloses a multi-positional storage unit. This unit can provide a shelf-like structure in a variety of positions to partition the storage area. However, this unit is large and tends to take up a significant amount of the usable storage space that is available to the operator. This unit also has a number of movable parts that may make operation of the unit time consuming and possibly difficult for some operators.

To enhance the cargo carrying capabilities of a vehicle in general, many manufacturers have tried to provide a functional relationship between the storage area and the passenger area. This is done in an effort to provide maximum passenger carrying capability while at the same time being able to provide enhanced cargo carrying capability when desired by the operator of the vehicle. Such a relationship is shown and described in commonly assigned U.S. Ser. Nos. 08/997,636 and 08/997,637, filed Dec. 23, 1997, which are hereby incorporated as reference.

There continues to be a need to enhance the cargo carrying capabilities of a vehicle's storage area and of a vehicle in general. Enhanced cargo carrying capability can be afforded by an increase in the functionality of a partitioning system for the storage area of a vehicle. Increased or improved functionality can be achieved by providing more useful partitioning locations as well as easy transitioning between the partitioning locations. There is also a need to provide a relatively horizontal surface in a vehicle to store large items. It is, therefore, desirable to provide a small and simple system that can enhance the functionality of the storage area to satisfy the aforementioned needs.

SUMMARY OF THE INVENTION

Accordingly, it is a principal objective of the present invention to provide a truly versitle partitioning system for the storage area of a motor vehicle.

It is another objective of the present invention to provide a light and easy to use shelf to enhance the functionality of the storage area of a motor vehicle.

It is still another objective of the present invention to provide a multipurpose shelf that can cooperate with multiple rows of seats to provide a generally horizontal load floor stretching from the instrument panel to the end gate.

It is a further objective of the present invention to provide a rear shelf that can be supported, while the end gate is open, in a horizontal position such that the rear shelf extends beyond the storage area as defined by a closed end gate.

In one form, the present invention provides a partitioning system for use in the storage area of a vehicle. The partitioning system includes a multi-positional shelf that can be positioned in a plurality of different locations. The shelf can be disposed horizontally near the top of the rear row of seats to act as a security cover. The shelf can be disposed horizontally to cooperate with a folded last row of seats to provide a generally flat surface that extends from the end gate into the passenger area. The shelf can be disposed horizontally along the floor in the storage area. The shelf can be disposed vertically and adjacent to the rear row of seats. The shelf can also be disposed in an extended horizontal position, while the end gate is open, such that the shelf extends beyond the storage area as defined by a closed end gate. The shelf includes a pivotable support leg that may contact the vehicle body to support the shelf in this horizontal position that extends beyond the storage area defined by a closed end gate.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 1a is a top view of the multi-positional shelf to vehicle quarter trim panel contact along the line 1A—1A of FIG. 1;

FIG. 8 is a top view of a multi-positional vehicle shelf;

FIG. 9 is a cross sectional view along the line 9—9 of FIG. 1a;

FIG. 10 is a bottom view of a multi-positional shelf;

FIG. 11 is a side view of a sidewall of a motor vehicle to illustrate the transition of the multi-positional shelf from the first security position to the vertical position or the third position.

DETAILED DESCRIPTION OF THE PREFERRED EMBODIMENT

Figure 1:
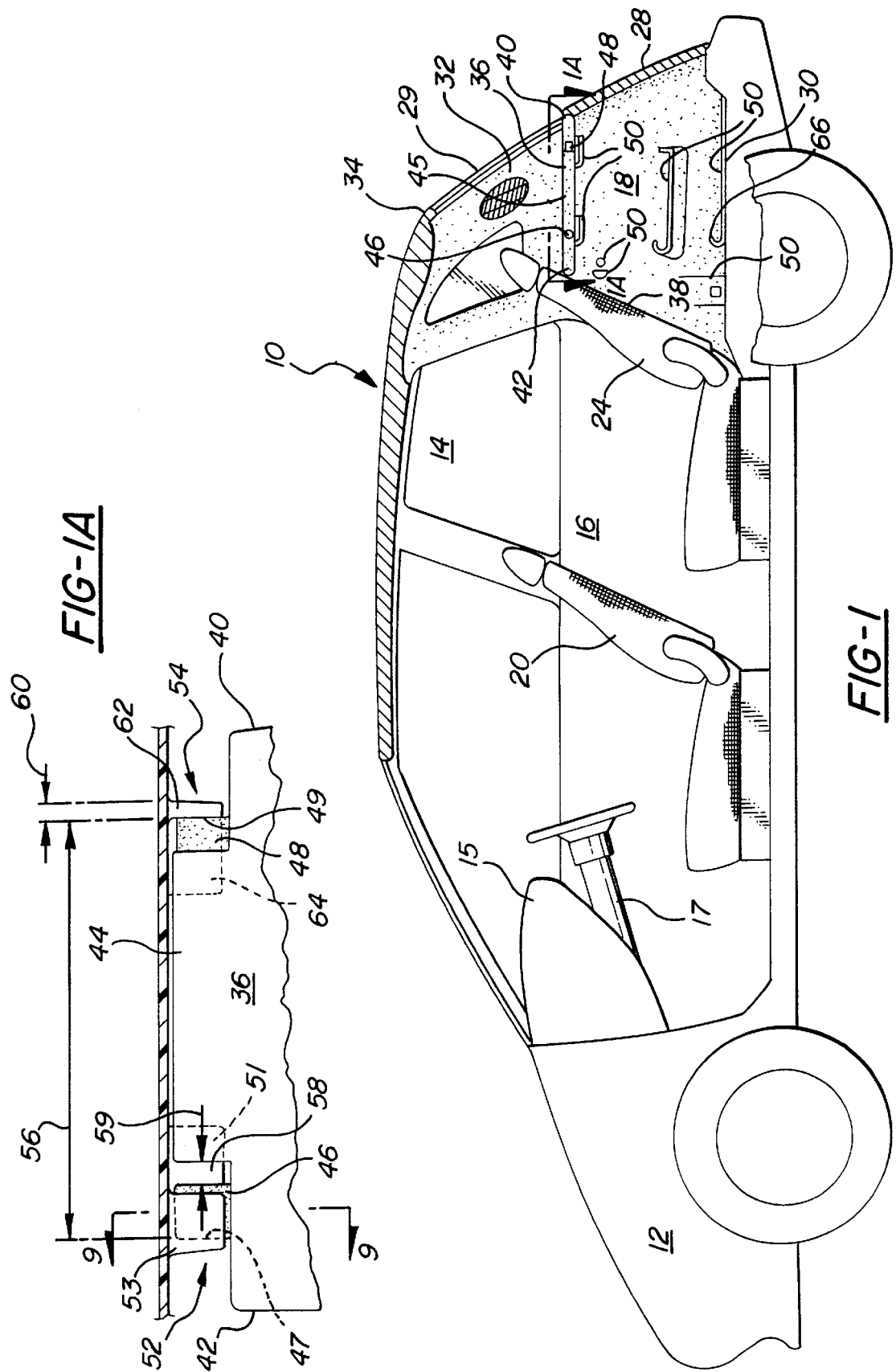
FIG. 1 is a side view of a motor vehicle with the left side of the body removed to illustrate a multi-positional shelf in a first security position.

Referring to the drawings, FIG. 1 provides a side view of a vehicle 10 with the left side of the vehicle body removed to clearly illustrate the present invention. Vehicle 10 includes an engine compartment 12 located at the front of vehicle 10 and a cabin 14. Located between engine compartment 12 and cabin 14 is an instrument panel 15, which includes a steering column 17 attached thereto. Cabin 14 includes a passenger area 16 and a storage area 18 located aft of passenger area 16. Passenger area 16 includes a pair of front seats 20,22 and a pair of rear seat 24,26 set rearward of the front seats, only the driver's front seat 20 and left side rear seat 24 are visible in FIG. 1.

Figure 7:
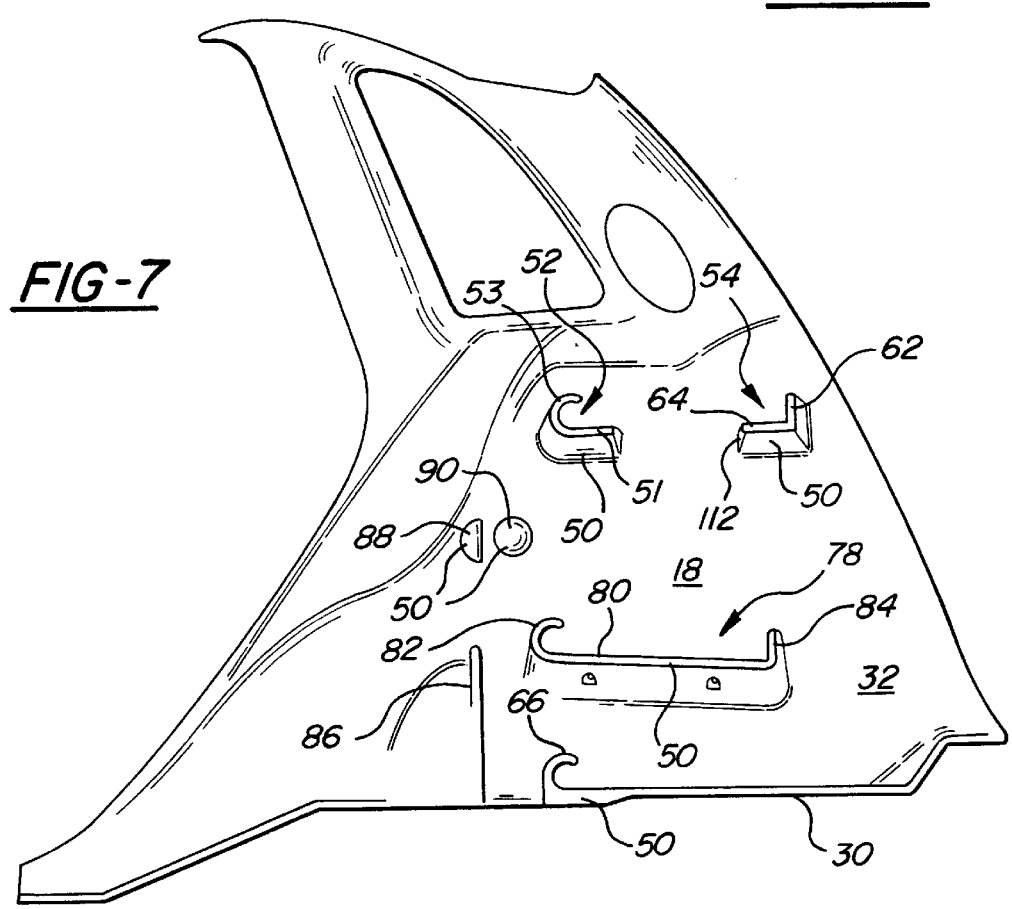
FIG. 7 is a perspective view of a sidewall or a quarter trim panel of a motor vehicle.

Storage area 18 is defined by rear seats 24 and 26, an end gate 28, a floor 30, and a pair of opposing sidewalls 32 and 33. In the exemplary embodiment, end gate 28 is a liftgate adapted to open about hinge 34. One may appreciate that the present invention may be utilized with any type of end gate including swing gates or tailgates. End gate 28 preferably includes a window 29 disposed therein. A multi-positional shelf 36 is provided for use within storage area 18 of vehicle 10. Shelf 36 is shown in a first security position in FIG. 1. Shelf 36 is disposed to prohibit both the sight and accessibility to storage area 18 while end gate 28 is closed, as illustrated in FIG. 1. Shelf 36 extends from end gate 28 to the seat backs 38 of rear seats 24,26. As best seen in FIG. 1A, shelf 36 includes a rear edge 40 disposed adjacent end gate 28 and a forward edge 42 adjacent seat backs 38 of the rear seats 24,26. Shelf 36 also extends from one opposing wall 32 to the other 33. Shelf 36 includes two side edges 44 and 45 disposed in contact with the sidewalls 32 and 33, respectively, of storage area 18. Each side edge 44 preferably includes a forward rubber stop 46 and a rearward rubber stop 48. Each sidewall 32 is equipped with a system of formations 50 to cooperate with side edge 44 to support shelf 36 in a plurality of different positions. Formations 50 generally refer to all projections and structures formed on, within, or otherwise mounted to sidewalls 32, 33. In one form of the present invention, the formations 50 are integrally molded into the sidewalls 32, which are , in turn, preferably made from plastic. FIG. 7 provides a clear view of the system of formations 50. Formations 50 that are utilized to support shelf 36 in a first security position include a front curl formation 52 and a rearward L-shaped formation 54. Curl formation 52 includes a cup structure 53 and a platform structure 51. L-shaped formation 54 includes a top portion 62 and a horizontal portion 64. Cup structure 53 and top portion 62 of L-shaped formation 54 are disposed a distance 56 apart, which is substantially equal to the distance between the forwardmost end 47 of the forward rubber stop 46 and the rearwardmost end 49 of the rearward rubber stop 48. Side edge 44 of shelf 36 includes a slot 58 disposed aft of and adjacent to forward rubber stop 46. Slot 58 is substantially equal in width 59 to the width 60 of the top portion 62 of the rearward L-shaped formation 54.

To place shelf 36 in the first security position, shelf 36 enters storage area 18 above L-shaped formation 54. Since the side edge 44 of shelf 36 contact with side wall 32 is identical to the contact occurring simultaneously with respect to the other side wall 33 and opposite side edge 45 of shelf 36, only one side will be described. As shelf 36 continues to move forward into storage area 18, front edge 42 is angled downward such that forward rubber stop 46 comes in contact with platform structure 51. While shelf 36 is still angled downward, shelf 36 is pushed forward by the operator of the vehicle such that the forwardmost end 47 of the forward rubber stop 46 contacts cup structure 53. One can appreciate that contact between forward rubber stop 46 and cup structure 53 is such that shelf 36 may pivot about forward rubber stop 46. To complete insertion into the first security position, the rear edge 40 of shelf 36 is pivoted downward such that rearward rubber stop 48 contacts both the horizontal portion 64 and the top portion 62 of the L-shaped formation 54. It should be appreciated that top portion 62 and cup structure 53 limit horizontal movement of shelf 36 in the longitudinal (forward/rearward) direction. It should be understood that although contact with formations 50 on only one sidewall 32 is described that similar functions are performed on the opposing sidewall 33 simultaneously. In the exemplary embodiment, the shelf 36 is then securely positioned such that only an upward pivot of rear edge 40 of shelf 36 will initiate movement. The removal of shelf 36 from the first security position and insertion into other positions will be described subsequently.

Further illustrating the contact between forward stop 46 and front curl formation 52 is FIG. 9, which is taken along the line 9—9 of FIG. 1A. Stop 46 is bound in the vertical direction by the opposing ends 108,110 of the curl formation 52. In one form, stop 46 is made of rubber to reduce the possibility of noise originating from movement between shelf 36 and the formations 50. It can be appreciated that the stop 46 may be comprised of many other materials as well.

Figure 2:
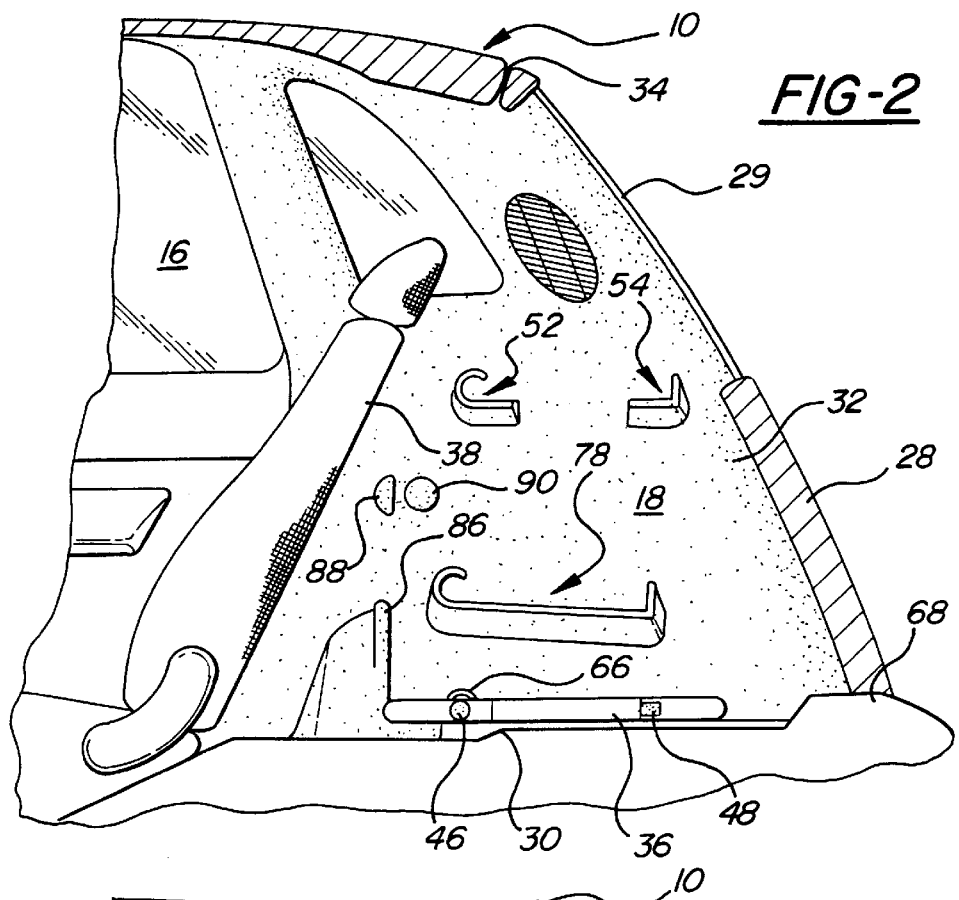
FIG. 2 is a side view of a motor vehicle with the left side of the body removed to illustrate a multi-positional shelf in a second storage position.

Turning to FIG. 2, multi-positional shelf 36 is illustrated in a second floor position in which the shelf 36 is substantially parallel and adjacent to floor 30. Forward movement of shelf 36 is restricted by a floor formation 66 essentially identical to curl formation 52, except that it is located near floor 30. Floor formation 66 limits forward movement of shelf 36. Lateral movement of shelf 36 is limited by sidewalls 32, 33. Insertion into the second floor position is performed by sliding shelf 36 in a substantially horizontal manner such that forward rubber stop 48 contacts floor formation 66.

Figure 3:
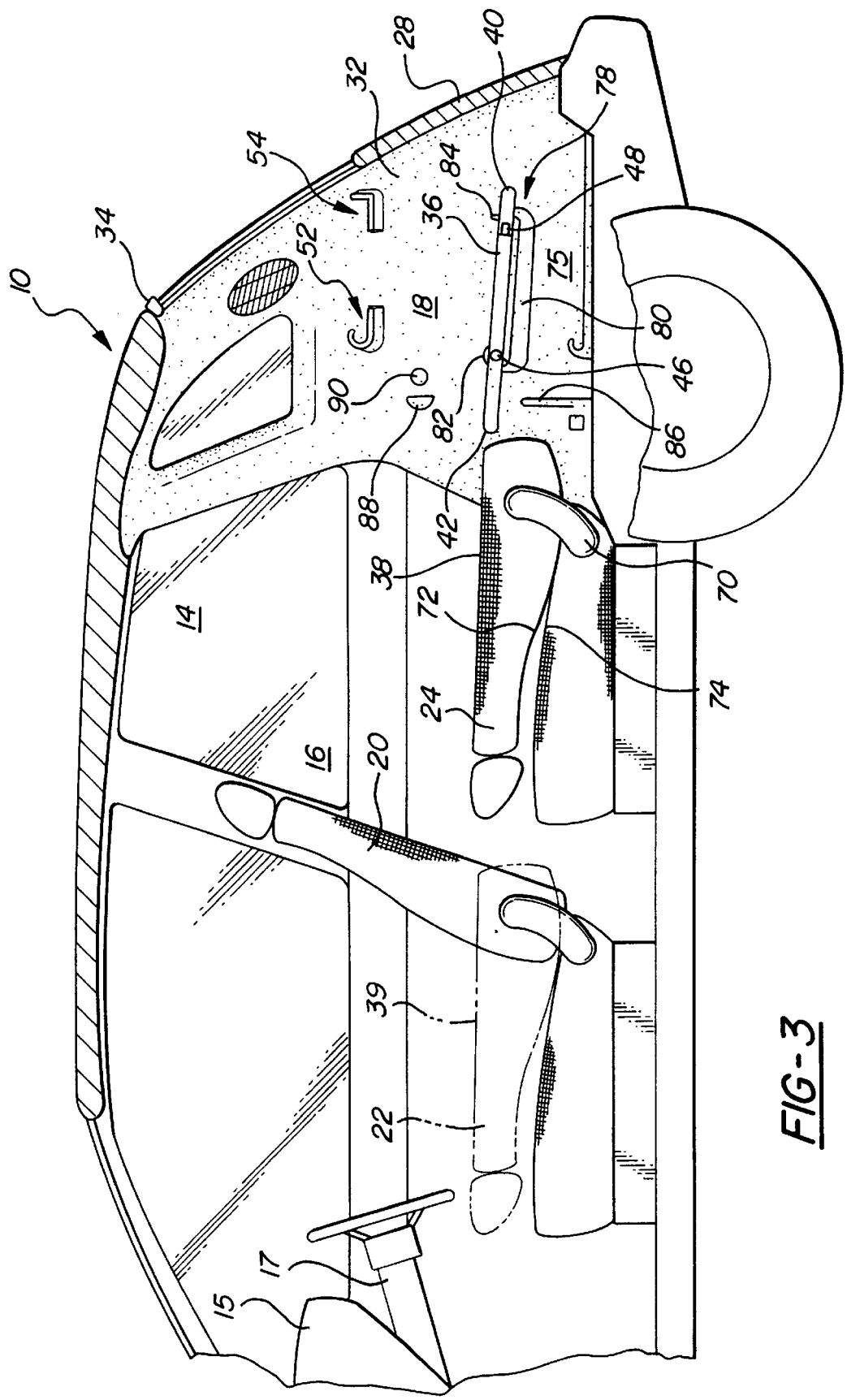
FIG. 3 is a side view of a motor vehicle with the left side of the body removed to illustrate a multi-positional shelf in a third position.
Figure 6:
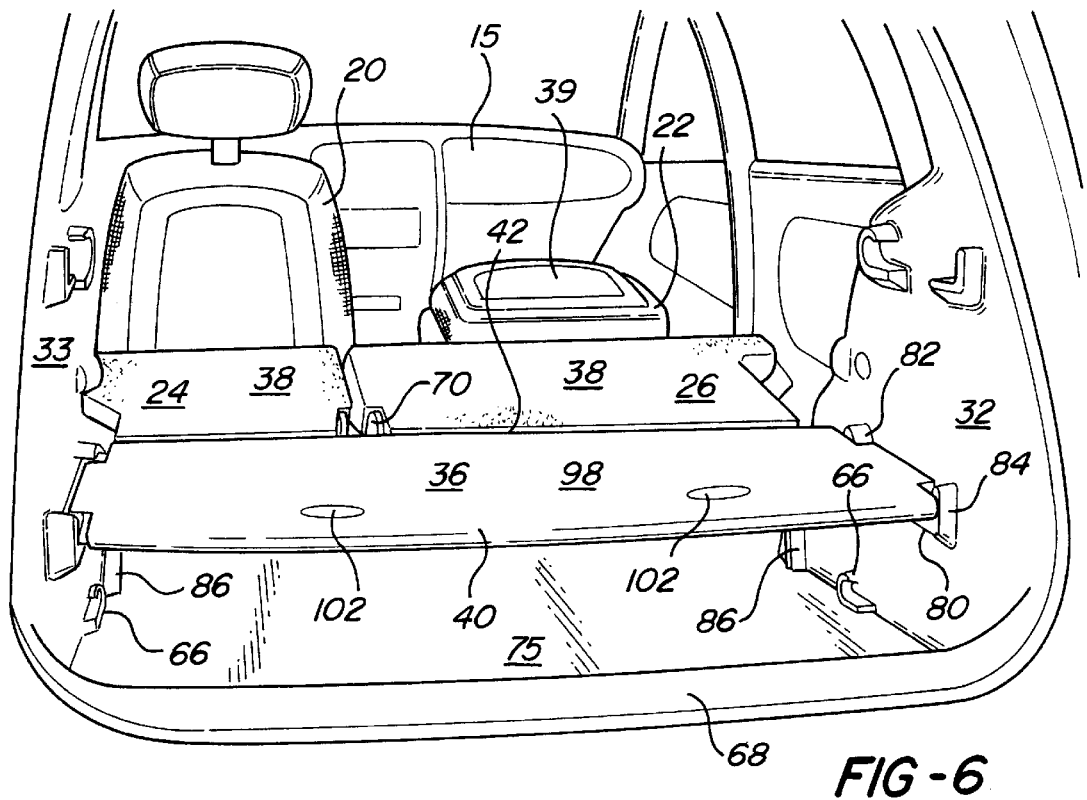
FIG. 6 is a rear view of a motor vehicle though the end gate with the rear row of seats and the front passenger seat folded.

FIGS. 3 and 6 illustrate vehicle 10 in an arrangement that provides a substantially horizontal load floor from the end gate 28 to the instrument panel 15. Rear seats 24,26 are foldable about a pivot pin 70 such that seat back cushion 72 contacts seat bottom cushion 74, thereby forming a substantially horizontal surface with seat back 38. Front passenger seat 22 is also foldable in a manner similar to rear seats 24,26 such that seat back 39 is substantially horizontal. The front passenger seat 22 and the rear seats 24,26 are arranged such that while folded all of the seat backs 38,39 are co-planar to provide an effective load floor. Shelf 36 is disposed in a third position cooperative with the seat backs 38,39 of both the front passenger seat 22 and the rear seats 24,26 in s the folded position. This cooperation, defined as shelf 36 being co-planar with seat backs 38,39 while the seats are folded, forms a relatively flat load floor that extends from the instrument panel 15 to the end gate 28. One may also appreciate that not only does vehicle 10 provide a relatively flat load floor, but also provides a storage place below shelf 36, the storage place is referenced by numeral 75.

Shelf 36 is supported in the third position by the system of formations 50 projecting from sidewalls 32, 33. Formations 50 include an elongated hook formation 78. Hook formation 78 comprises a base portion 80, a front coupling portion 82, and a rear projection portion 84. Shelf 36 is supported in this third position in a manner essentially equivalent to the manner in which the shelf is supported in the first security position. Insertion into the third position can be accomplished in a plurality of ways. One way, is to bring shelf 36 into storage area 18 in a substantially horizontal manner above the rear projection portion 84 and below the L-shaped formation 54. As shelf 36 continues to move further into storage area 18 the forward edge 42 of shelf 36 is angled downward so that forward rubber stop 46 contacts base portion 80. Shelf 36 then slides along base portion 80 until stop 46 contacts front coupling portion 82. When the forward most end 47 of forward rubber stop 46 is in contact with coupling portion 82, shelf 36 may be pivoted about an cross car axis formed through forward rubber stop 46. One may appreciate that rear edge 40 of shelf 36 is pivoted downward such that rearward rubber stop 48 contacts both the rear projection 84 and a part of base portion 80. This restricts all movement of shelf 36 other than the upward pivoting of rear edge 40 about an axis defined through forward rubber stop 46. Once rear edge 40 of shelf 36 is pivoted, shelf 36 may be removed from the third position in a manner opposite of the insertion of shelf 36 into the third position.

Figure 4:
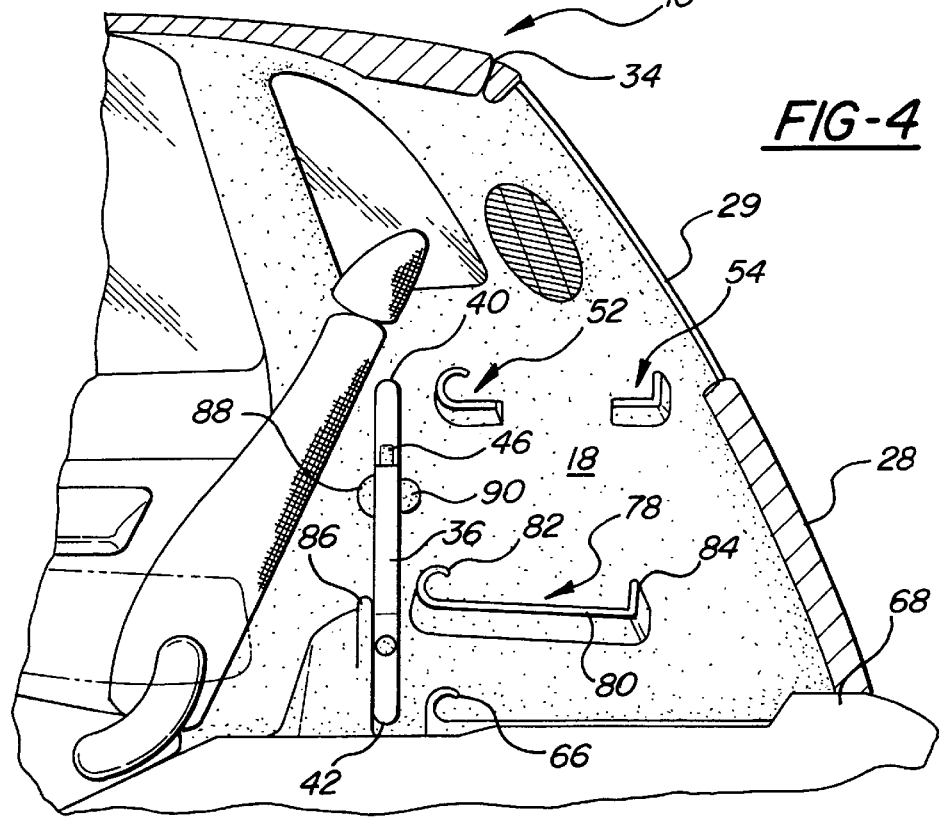
FIG. 4 is side view of a motor vehicle with the left side of the body removed to illustrate a multi-positional shelf in a fourth vertical position.

Turning to FIG. 4, shelf 36 is shown in a vertical fourth position. This position locates shelf 36 between the storage area 18 and the passenger area 16 and is useful for storage of shelf 36. In the fourth vertical position, forward edge 42 is positioned near floor 30 and is held in position by formations 50. Forward movement of shelf 36 is prohibited by floor wedge 86 and crescent wedge 88. Disposed rearward of crescent wedge 88 is a hemispherical formation 90. Crescent wedge 88 and hemispherical formation 90 act to position shelf 36 therebetween. Hemispherical formation 90 is comprised of a resilient rubber-type material that can flex backward toward sidewall 32 as shelf 36 is forced past it. As shelf 36 is forced past hemispherical formation 90, hemispherical formation 90 resiles to provide a tight fit for shelf 36 between formation 90 and wedge 88. This fit can only be disassembled by the force needed to make hemispherical formation 90 resile form forced contact with shelf 36. This force is substantially identical to the force needed to establish the tight fit. Insertion and, conversely, removal of shelf 36 from the fourth vertical position will be discussed subsequently.

Figure 5:
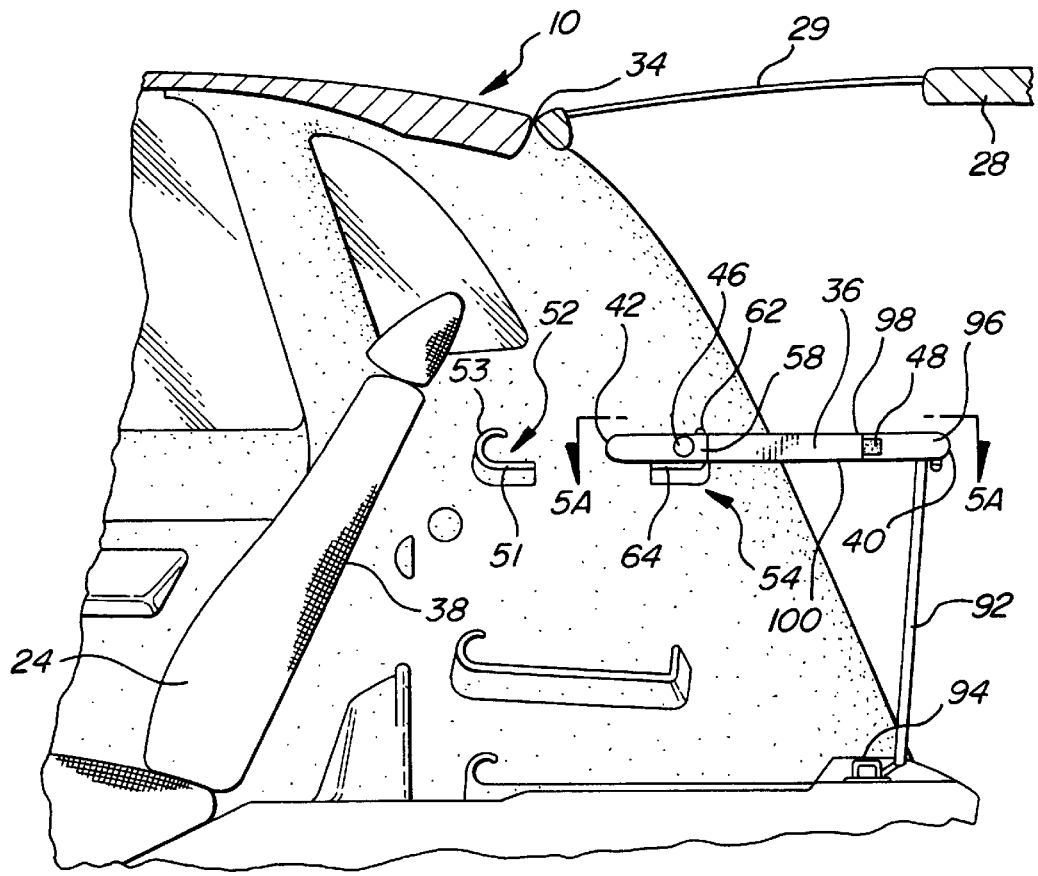
FIG. 5 is a side view of a motor vehicle with the left side of the body removed to illustrate a multi-positional shelf in a fifth position wherein said shelf, while the end gate is open, extends beyond the storage area defined by a closed end gate.

FIG. 5 illustrates vehicle 10 with the left side of the body removed to illustrate the multi positional shelf 36 in a fifth position wherein shelf 36, while the end gate 28 is open, extends horizontally beyond the storage area 18 defined by a closed end gate 28. The fifth position provides shelf 36 in a location that is convenient for many activities by the operator of the vehicle, such activities include what is commonly referred to 'tailgating'. Shelf 36 is positioned such that forward rubber stop 46 contacts both the horizontal portion 64 and the top portion 62 of L-shaped formation 54.

Figure 5A:
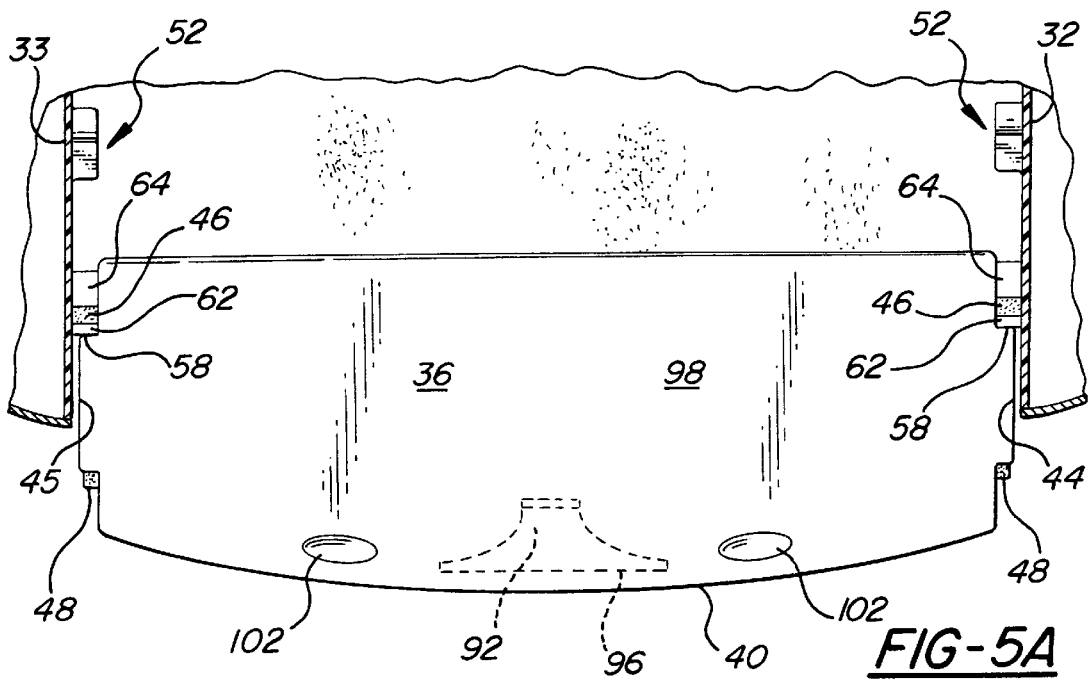
FIG. 5a is a top view of the multi-positional shelf to quarter panel contact along the line 5a—5a of FIG. 5.

Slot 58 of width 59 is adapted to receive top portion 62 to limit lateral movement of shelf 36 in this position. This aspect of the present invention is best seen in FIG. 5a. The rear edge 40 of shelf 36 is support by leg 92. Leg 92 is pivotally connected to shelf 36 on one end and contacts vehicle sill 68 of vehicle 10 on the other end. In the preferred embodiment, leg 92 is designed to contact striker 94 that protrudes from sill 68. Leg 92 is pivotally connected to shelf 36 and pivots about the axis 96. As leg 92 pivots toward shelf 36, leg 92 may be secured to shelf 92 by means of a resilient clip (not shown) such that leg 92 does no protrude therefrom.

Shelf 36 is best shown in FIGS. 8 and 10, the top side 98 of shelf 36 is illustrated in FIG. 8 and the bottom side 100 is illustrated in FIG. 10. Top side 98 is comprised of carpet or felt material and includes handles 102 formed therein for ease of moving or transitioning shelf 36 between positions. Bottom side 100 includes clips 104 formed thereon for attaching grocery bags, cargo nets and other similar objects. Bottom side 100 is comprised of plastic and further includes a series of ridges 106 formed thereon for helping to position cargo. One can appreciate that all of the drawings have been shown with the top side 98 up, shelf 36 may be flipped over such that the bottom side 100 is up and still function properly in the first, second, third, and fourth positions.

FIG. 7 illustrates the system of formations 50 on side wall 32. Front curl formation 52 and L-shaped formation 54 are used to support shelf 36 in a first security position. Floor formation 66 is used to support shelf 36 in a second floor position. Hook formation 78 is used to support shelf 36 in a third position coplanar with the seat backs 38,39 of seats 22, 24, 26 while said seats are folded. A floor wedge 86, a crescent wedge 88, and a hemispherical formation 90 to support shelf 36 in a fourth vertical position. L-shaped formation 54 and vehicle sill 68 cooperate with shelf 36 and leg 92 to support shelf 36 in a fifth position in which shelf 36 extends horizontally beyond the storage area 18 defined by a closed end gate.

With continuing reference to FIGS. 1,2,3,4, and 5 and additional reference to FIG. 11, multi-purpose shelf 36 is provided. Shelf 36 is in a first security position as seen in FIG. 1. Shelf 36 may be removed from the first security position by raising the rear edge 40 of shelf 36 such that shelf 36 pivots about the forward rubber stop 46. Shelf 36 may then be removed by sliding shelf 36 slightly rearward and lifting shelf 36 out of the storage area 18. Shelf 36 may then be reintroduced into storage area 18 at a lesser height to secure shelf 36 in the third position as described previously. Shelf 36 may also be reintroduced into storage 18 at an even lower height to secure shelf in a second floor position as described previously.

A guide 112 may also be used to while removing shelf 36 from the first security position to transition shelf 36 into the fourth vertical position or the third position without removing shelf 36 from the storage area 18. After the rear edge 40 of shelf 36 is raised so as to allow forward rubber stop 46 to slide rearward until stop 46 is no longer supported by platform 51, at such time shelf 36 will naturally fall downward. As the shelf naturally moves downward, guide 112 contacts shelf 36. Guide 112 can be used to aim shelf 36 either towards the third position or the fourth vertical position. If shelf 36 is angled steeply on guide 112 it will be guided into the third position. As the shelf 36 moves downward and contacts the base portion 80 of hook formation 78. This movement is illustrated by arrow 114 in FIG. 11. Shelf 36 may then be slid forward and pivoted clockwise illustrated by the transition 116 in FIG. 11. Then shelf 36 completes the pivot motion, shown by arrow 118, until shelf 36 reaches a substantially horizontal position and rearward rubber stop 48 contacts both the rear projection portion 84 and the base portion 80 of the hook formation 78. If shelf 36 is less severely angled on guide 112 it will be guided into the fourth vertical position. As the shelf 36 moves forward and downward it contacts either floor 30 or floor wedge 86. This movement is illustrated by arrow 120 in FIG. 11. Shelf 36 may then be forced past hemispherical formation 90 so as to become wedged between hemispherical formation 90 and crescent wedge 88. Shelf 36 may be removed from the fourth vertical position in a manner substantially opposite that described for installation. One skilled in the art may appreciate a number of various ways to install or remove shelf 36 from the various positions. The above descriptions are intended to be exemplary motions, and the present invention is, by no means, limited to the movements set forth and described herein.

Shelf 36 is preferably constructed out of a single piece of glass filled polypropylene using a blow molding process. Top side 98 carpet is preferably applied during the blow molding process without a significant degradation of the overall strength of the shelf.

While the above description constitutes the preferred embodiment of the invention, it will be appreciated that the invention is susceptible to modification, variation, and change without departing from the proper scope or fair meaning of the accompanying claims.

What is claimed is:

1. A partitioning system for use in a storage area of a vehicle, said storage area defined by a row of seats, a closed end gate, two side walls, and a floor, said partitioning system comprising:

a shelf capable of being located in a plurality of positions;

a system of operable formations adapted to support said shelf in a plurality of positions, said system of operable formations includes a forward curved formation to limit forward horizontal movement while allowing pivotal movement of said shelf and a rear L-shaped formation to provide support and limit rearward horizontal movement of said shelf, said forward curved formation and said L-shaped formation cooperate to support said shelf in a horizontal manner in a first position of said plurality of positions.

2. The partitioning system as set forth in claim 1, wherein said system of operable formation includes a second forward curved formation and a second rear L-shaped formation disposed vertically below said first forward curved formation and said first rear L-shaped formation.

3. The partitioning system as set forth in claim 2, wherein said second forward curved formation and said second rear L-shaped formation are interconnected by a base portion, said base portion, said second forward curved formation, sand said second rear L-shaped formation cooperate to support said shelf in a horizontal in a second position of said plurality of positions.

4. The partitioning system as set forth in claim 3, wherein said shelf includes a forward and rearward stop, said forward stop adapted to contact said first or second curved formation and said rearward stop adapted to contact first or second L-shaped formation.

5. The partitioning system as set forth in claim 4, wherein said system of operable formations includes a third forward curved formation disposed vertically below said second forward curved formation.

6. The partitioning system as set forth in claim 4, wherein said shelf includes a slot formed near said forward stop that is adapted to receive said L-shaped formation while said shelf is in a third position of said plurality of positions, said L-shaped formation and said slot cooperate to limit forward and rearward horizontal movement of said shelf.

* * * * *